No. 647,487. Patented Apr. 17, 1900.
H. B. FRAZIER.
STRIKING BAG SUPPORT.
(Application filed Apr. 22, 1899.)
(No Model.)
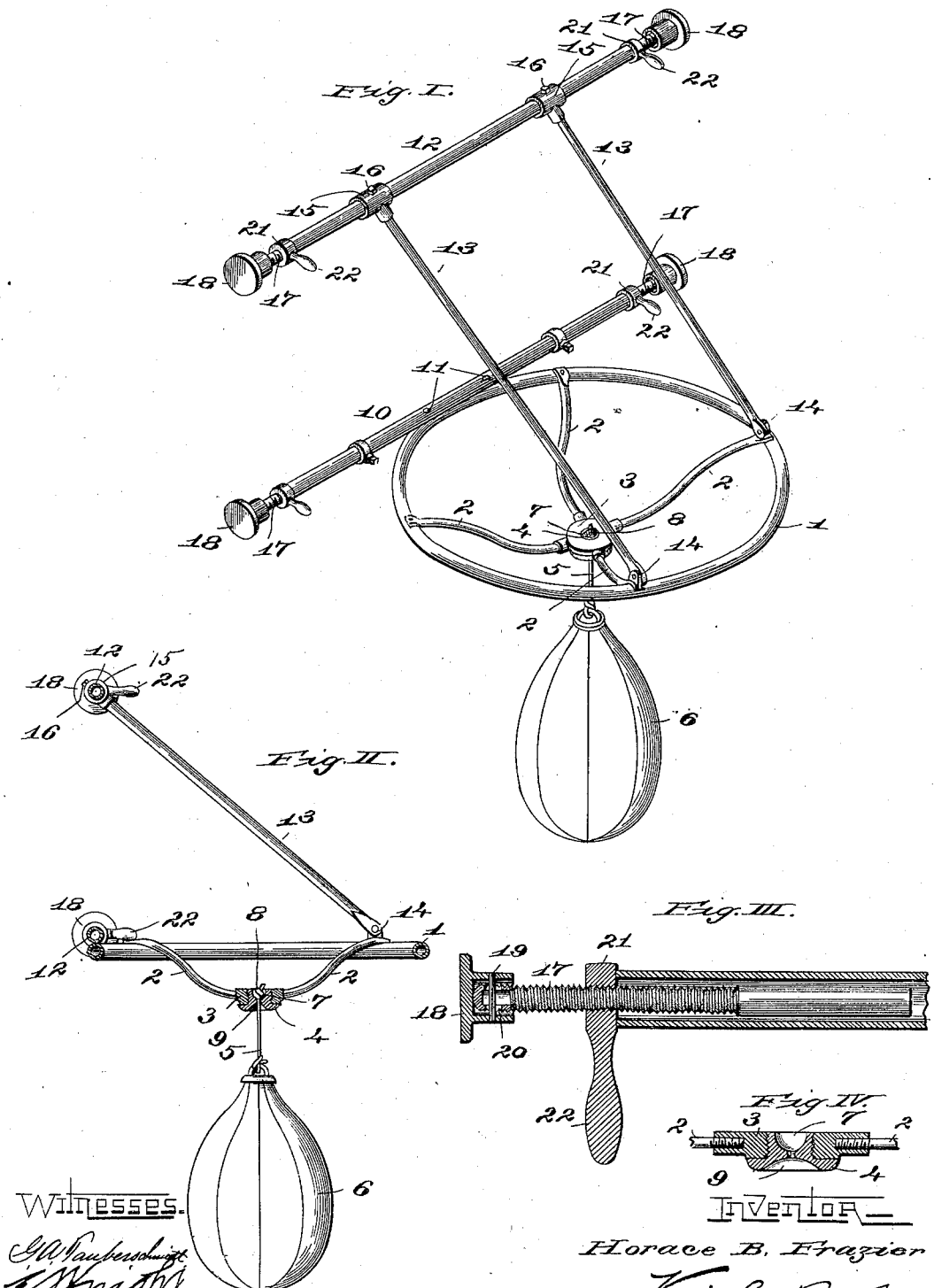

UNITED STATES PATENT OFFICE.

HORACE B. FRAZIER, OF ST. LOUIS, MISSOURI, ASSIGNOR OF ONE-HALF TO JOHN R. BOYDEN, OF SAME PLACE.

STRIKING-BAG SUPPORT.

SPECIFICATION forming part of Letters Patent No. 647,487, dated April 17, 1900.

Application filed April 22, 1899. Serial No. 714,043. (No model.)

*To all whom it may concern:*

Be it known that I, HORACE B. FRAZIER, a citizen of the United States, residing at the city of St. Louis, in the State of Missouri, have invented certain new and useful Improvements in Striking-Bag Supports, of which the following is a full, clear, and exact description, reference being had to the accompanying drawings, forming part of this specification.

The object of my invention is to provide a striking-bag support that will be cheap, of small size, and at the same time rigid and durable, and which can be secured in a doorway or window-opening and quickly removed when desired.

My invention consists in features of novelty hereinafter fully described, and pointed out in the claims.

Figure I is a perspective view of my improved punching-bag support. Fig. II is a vertical section of the same. Fig. III is an enlarged detail view showing one of the clamping-screws. Fig. IV is an enlarged detail view of the hub of the spider.

1 represents a rebound-ring, against which the bag impacts when in use. This ring is preferably made of metallic tubing. It supports a spider consisting of radial curvilinear arms 2 and a hub or center plate 3, into which the arms are screwed before being riveted to the ring.

4 represents a nut tapped into the hub 3, and through which the cord 5 of the bag 6 is passed. The upper face of the nut has a recess 7 to receive a knot 8 on the end of the cord, and the lower face of the nut has a conical recess 9 to permit the cord to swing freely.

The arms 2 are bent downwardly from the ring, so that the hub 3 is located beneath the lower surface of the ring, against which the bag contacts when in use, thus providing for the use of a short cord and a small ring, while the action of the bag is quick in its movements.

One edge of the ring is secured to a hollow bar 10 at 11. The outer part of the ring is suspended from a similar bar 12 by means of rods 13, hinged to the ring at 14, as shown. The bar 12 carries T-couplings 15 for the upper ends of the rods 13, held by means of set-screws 16. Fitting within the bars are screw-threaded rods 17, having loosely-connected heads 18 on their outer ends, the heads being provided with sockets to receive the ends of the rods, to which they are connected by pins 19, passing through slots 20 in the rods, as shown in Fig. III.

21 represents nuts on the rods, provided with handles 22 and which bear against the ends of the bars. It will thus be observed that when the apparatus is placed in a window or door opening and the nuts 21 turned to run the rods 17 outwardly the heads 18 will be forced against the vertical walls of the window or door opening and the apparatus will thus be firmly held in place. In practice the bar 10 would be first clamped in place and then the ring moved to a horizontal position by moving the bar 12 up or down, (this being permitted by the pivotal connection between the rods 13 and the ring,) and when the ring is brought to a horizontal position the bar 12 is clamped in position. The apparatus can be quickly removed by turning the nuts 21 backwardly.

I claim as my invention—

1. A striking-bag support comprising a rebound-ring, a hub located at a lower elevation than the rebound-ring, and arms secured to the rebound-ring at their outer ends and supporting the hub at their inner ends; substantially as described.

2. A striking-bag support comprising a rebound-ring, a hub located at a lower elevation than the rebound-ring, and radial curvilinear arms secured to the rebound-ring at their outer ends and supporting the hub at their inner ends; substantially as described.

3. A striking-bag support comprising a rebound-ring, a hub located at a lower elevation than the rebound-ring, arms secured to the rebound-ring at their outer ends and supporting the hub at their inner ends, and a nut having upper and lower recesses and secured to the hub; substantially as described.

4. A striking-bag support comprising a rebound-ring having means centrally located, at a lower elevation than the rebound-ring, for supporting the bag, and a bar to which the rebound-ring is secured, provided with adjustable end clamps; substantially as described.

5. A striking-bag support comprising a rebound-ring having means centrally located, at a lower elevation than the rebound-ring, for supporting a bag, a bar provided with end clamps and to which the ring is rigidly secured, and another bar provided with end clamps, and to which the ring is hinged; substantially as described.

6. A striking-bag support comprising a rebound-ring having means centrally located, at a lower elevation than the rebound-ring, for supporting a bag, a bar rigidly secured to the rebound-ring and provided with end clamps, a second bar, rods secured to the second bar and hinged to the rebound-ring, and end clamps carried by the second bar; substantially as described.

7. A striking-bag support comprising a rebound-ring having means centrally located at a lower elevation than the rebound-ring, for supporting a bag, a pair of bars supporting the rebound-ring, threaded rods provided with heads and fitting in the bars, and nuts provided with handles and mounted on the rods; substantially as described.

HORACE B. FRAZIER.

In presence of—
   E. S. KNIGHT,
   G. A. TAUBERSCHMIDT.